United States Patent

Hutchings

[15] 3,654,404

[45] Apr. 4, 1972

[54] HEADSET CRADLE

[72] Inventor: Kenneth J. Hutchings, Soquel, Calif.

[73] Assignee: Pacific Plantronics, Inc., Santa Cruz, Calif.

[22] Filed: Apr. 1, 1970

[21] Appl. No.: 24,496

[52] U.S. Cl. ..........179/146 R

[51] Int. Cl. ..........H04m 1/06

[58] Field of Search ..........179/100 R, 100 D, 146 R, 178, 179/147, 184, 185, 179, 156; D26/14.1; D85/2; 40/336

[56] References Cited

UNITED STATES PATENTS

| | | | |
|---|---|---|---|
| 2,655,760 | 10/1953 | Dorenbaum | 40/336 |
| 3,548,118 | 12/1970 | Hutchings | 179/156 |
| 3,368,296 | 2/1968 | Edwards | 179/146 |
| 3,532,837 | 10/1970 | Dyar et al. | 179/156 |
| D202,459 | 9/1965 | Aro | D85/2 |
| D172,130 | 5/1954 | Coulter | D26/14 |
| D220,628 | 5/1971 | Crew | D26/14 |

*Primary Examiner*—Kathleen H. Claffy
*Assistant Examiner*—Randall P. Myers
*Attorney*—Flehr, Hohbach, Test, Albritton & Herbert

[57] ABSTRACT

A cradle for supporting and positioning a communications headset on a telephone housing. The cradle includes a spring metal clip for releasably engaging a wall of the telephone housing to position the cradle so that a headset is safely held when not in use. The component elements of the headset, such as the voice tube, acoustic tube, earpiece, and cable are held by the cradle in a position free from damage and soiling.

5 Claims, 4 Drawing Figures

INVENTOR.
KENNETH J. HUTCHINGS
BY
Flehr, Hohbach, Test, Albritton & Herbert
ATTORNEYS

HEADSET CRADLE

BACKGROUND OF THE INVENTION

Headsets have previously been provided for use by radio and telephone operators, office personnel, and other personnel using communications systems. Light weight, self-supporting headsets of the type disclosed in co-pending application Ser. No. 839,016, filed July 3, 1969, have been developed for wearing above a user's ear without a supporting headband. This type of headset has found particular application in certain jobs, such as in an office, where it is desirable that the user be free to perform a variety of duties such as typing, filing, paperwork, or dictation and the like without removing the set and interrupting the flow of business calls. When the user leaves his work area and removes the headset, it is oftentimes placed on the desk top or other work area where it is exposed to damage or injury. The need has thus been recognized for a simple and inexpensive device which will hold the headset when not in use in a convenient location, and which will protect its elements from damage or soiling.

SUMMARY OF THE INVENTION AND OBJECTS

Accordingly, it is an object of the invention to provide a simple and inexpensive device to hold a communications headset in a secure location when not in use.

Another object is to provide a cradle for holding a communications headset in a manner protecting the headset elements from damage or soiling.

Another object is to provide a cradle attachable to the side wall of a telephone housing for holding a communications headset in a conveniently accessible location when the user desires to leave the work area.

Another object is to provide a headset supporting cradle in combination with a telephone housing and in which the cradle is fabricated from a small number of parts.

The foregoing and other objects of the invention are achieved by a relatively small and light weight cradle of molded plastic construction having a spring metal clip positioned for releasably attaching the cradle to the side wall of a telephone housing. The cradle opens upwardly to receive and support a communications headset of the self-supporting type. The elements of the headset, including the voice tube, accoustic tube, earpiece, housing, and electric cord are protected in their cradled position from damage or soiling. In the cradled position, the headset is conveniently accessible adjacent the telephone in the user's work area, such as on a desk top.

DETAILED DESCRIPTION OF THE PREFERRED EMBODIMENT

Figure 1:
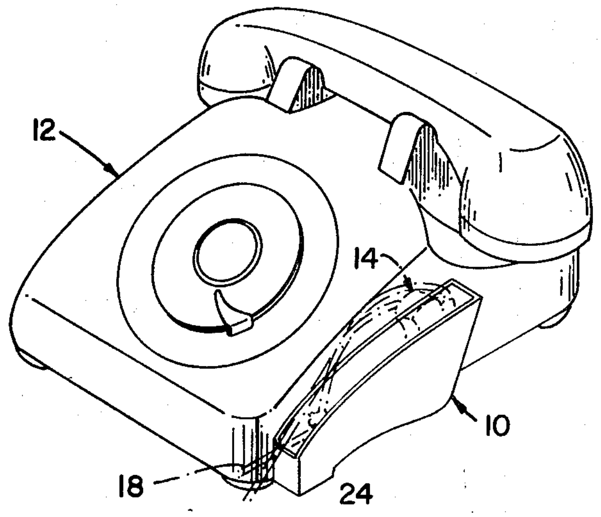
FIG. 1 is a perspective view of a communications headset cradle incorporating features of the invention shown in its mounted position on a telephone.

Referring now to the drawings and particularly FIG. 1, a headset cradle 10 incorporating features of the invention is illustrated in its mounting relationship with a conventional telephone 12. Cradle 10 is adapted to receive and support a communications headset 14 of the self-supporting type when not in use, such as when the user leaves the work area.

Figures 2, 3, 4:
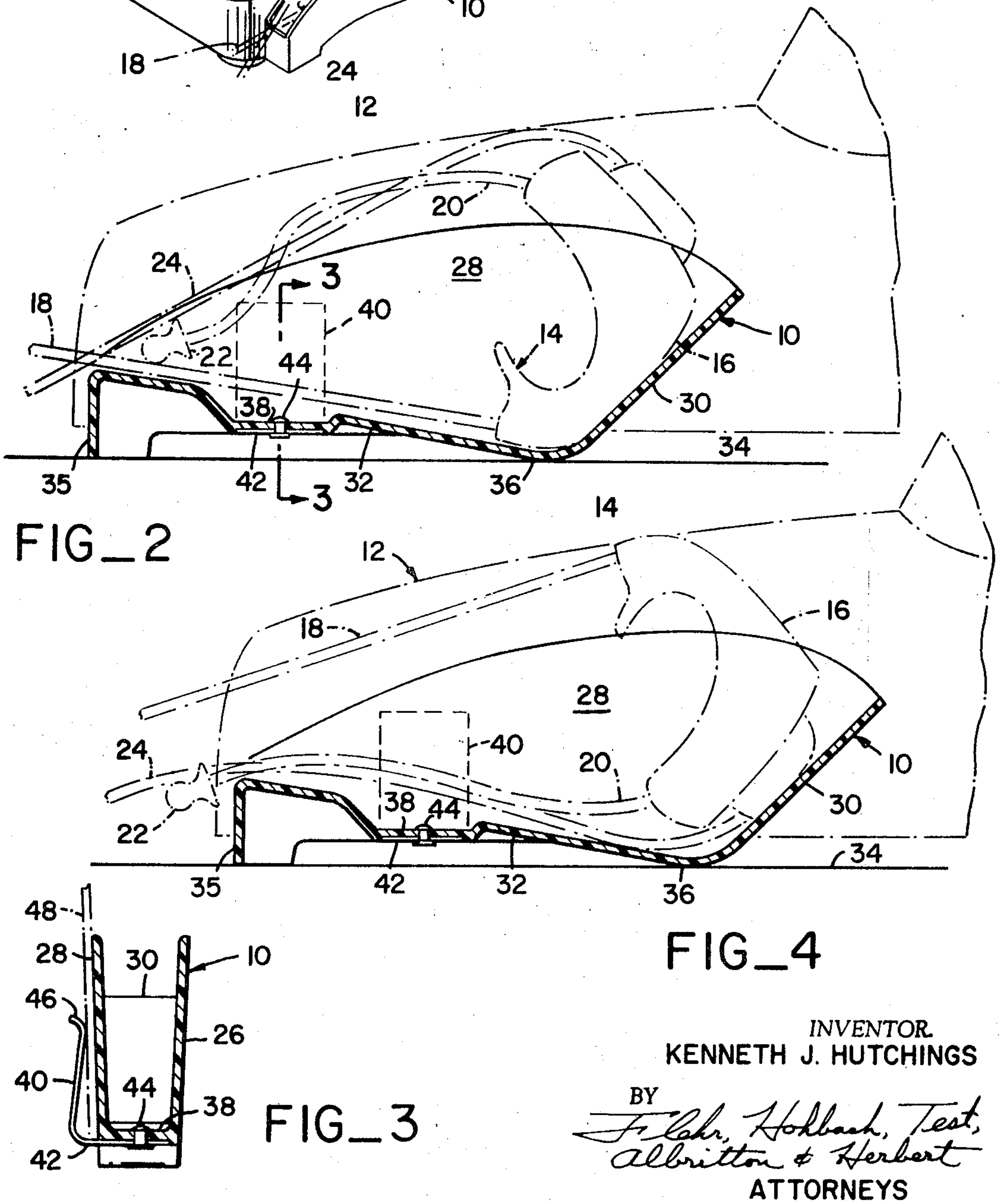
FIG. 2 is an enlarged elevation view in longitudinal section of the cradle of FIG. 1.
FIG. 3 is an enlarged section view taken along the line 3—3 of FIG. 2; and, FIG. 4 is an enlarged elevation view in longitudinal section of the cradle showing another mounting position for the headset.

The exemplary self-supporting headset 14 may be of the type disclosed in co-pending application Ser. No. 839,016 filed July 3, 1969. This type of headset includes a housing 16, voice tube 18, flexible accoustic tube 20 provided with an earpiece 22, and cord 24 carrying the electrical leads to the microphone and receiver transducers in the headset housing. When in use, headset 14 rests on the user's ear with the voice tube adjacent his mouth and the earpiece inserted into the ear canal. When not in use, the user may remove the headset and place it in position in cradle 10 as illustrated in FIGS. 1 and 2.

Cradle 10 comprises a body of molded plastic formed with side walls 26,28, inclined rear wall 30, and base segment 32 which together define an upwardly opening cavity of a width sufficient to receive the headset, and of a length sufficient to hold the length of flexible accoustic tube 20 above supporting surface 34, which would be an office desk or the like supporting the telephone. A leg 35 is molded integrally below the front end of cradle base 32, and this leg together with the arcuate edge 36 between the base and inclined wall 30 support the cradle on the desk surface. A flat boss 38 is molded integrally on the bottom of base 32 for mounting a clip 40. The boss defines a recess for receiving base 42 of the clip, and a suitable fastener, such as rivet 44, is secured in aligned openings through clip base 42 and cradle base 38 for locking the clip in place.

Clip 40 is formed of a suitable spring metal material and includes an upwardly extending clip segment 46. Clip segment 46 is flared outwardly at its upper end for guiding the clip onto telephone housing wall 48. As the clip and cradle are forced onto the housing wall, clip segment 46 yieldably spreads outwardly and releasably grips the cradle in place. The cradle may then be adjusted for and aft of the telephone housing to the desired position illustrated in FIG. 2.

In use, the headset cradle 10 is clipped to the side of the telephone housing and adjusted so that the cradle leg 35 and arcuate edge 36 are resting on the desk surface, with the cradle positioned sufficiently forward of the telephone housing so that a cradled headset does not interfere with operation of the telephone. When the user desires to remove his headset, it is positioned upside down with the top portion of headset housing 16 resting on incline wall 30 and arcuate edge 36. Voice tube 18 and cable 24 extend forwardly and project from the cradle open end as shown in FIG. 2. The downward and rearward incline of base 32 restrains the headset from unintended or accidental removal from the cradle. Voice tube 18 is relatively rigid and remains substantially in the position illustrated, while flexible accoustic tube 20 folds over as illustrated in FIG. 2 so that the ear piece 22 is retained in the headset cradle 10 and does not come in contact with desk surface 34. Thus, the elements of the headset are out of the way and protected from injury or damage, while earpiece 22 does not become soiled from contact with the desk surface. The headset is in an easily accessible location adjacent the telephone where the user can quickly and conveniently reach it.

The headset cradle 10 is designed such that even if the headset is incorrectly inserted therein, it is still retained securely and protected from soiling and injury. Thus, as shown in FIG. 4, the headset can be positioned so that the rear of the headset housing 16 rests on inclined wall 30. In this configuration, voice tube 18, accoustic tube 20, and cable 24 extend forwardly and project from the cradle open end. The downward and rearward incline of base 32 restrains the headset from unintended or accidental removal from the cradle. Voice tube 18 is relatively rigid and remains substantially in the position illustrated, while flexible accoustic tube 20 rests on the cradle base so that earpiece 22 does not come in contact with desk surface 34. Thus, even if the headset is incorrectly inserted into the cradle 10 the elements of the headset are out of the way and protected from injury and damage, and earpiece 22 does not become soiled from contact with the desk surface.

From the foregoing it is apparent that there has been provided a new and improved device for cradling a communications headset adjacent a telephone. The device is relatively simple and inexpensive to build and comprises a minimum of parts. It is easily clipped to the housing wall of a conventional telephone where it safely cradles the headset in a manner protecting the headset elements from injury or soiling, and where it is readily accessible for use.

While the foregoing embodiment is considered to be preferred, it is understood that numerous variations and modifications in the construction and arrangement of parts may be made by those skilled in the art within the scope and spirit of the invention as expressed in the appended claims.

I claim:

1. A cradle for supporting a communications headset of the self-supporting type on the side of a telephone housing, the headset having a voice tube, accoustic tube, housing, and cord, the cradle comprising the combination of: a cradle body including a pair of spaced-apart side walls, a rear wall diverging upwardly from the horizontal, and a base segment inclining downwardly and rearwardly towards the lower end of said rear wall, the side and rear walls together with said base segment defining an upwardly opening cavity, the cradle body adapted to receive the headset between the side walls and in the cavity with the headset housing supported on the rear wall and for restraining the headset from unintended removal, and with the cord supported on the base segment; support means on the cradle body for supporting the cradle on a surface supporting the telephone; and clip means mounted on the cradle for releaseably attaching the cradle to said side wall of the telephone.

2. The invention of claim 1 and further characterized in that the acoustic tube is supported on the base segment.

3. The invention of claim 1 and further characterized in that the acoustic tube folds over into said upwardly opening cavity.

4. The invention of claim 1 and further characterized in that the clip means includes a body of spring metal material having a flat base mounted below the cradle base segment and a clip segment extending upwardly along one of said cradle side walls for yieldably gripping the telephone housing side wall therebetween.

5. The invention of claim 1 and further characterized in that the cradle body base segment is formed with an integral flat boss on the lower surface thereof, said clip means includes a spring metal clip having a flat base mounted on the boss and a clip segment extending upwardly along one of said cradle side walls for yieldably gripping the telephone housing side wall therebetween, and means securing said clip base to said boss.

* * * * *